US006406784B1

(12) United States Patent
Cerrah

(10) Patent No.: US 6,406,784 B1
(45) Date of Patent: *Jun. 18, 2002

(54) COMPOSITE MEMBER

(75) Inventor: Ken Michael Cerrah, Fairport, NY (US)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/350,926

(22) Filed: Jul. 12, 1999

(51) Int. Cl.[7] ........................................ B32B 18/00

(52) U.S. Cl. .................... 428/325; 428/36.91; 428/421; 428/422; 428/457; 428/463; 492/56

(58) Field of Search ................................ 428/323, 332, 428/325, 421, 422, 457, 463, 36.9, 36.91; 492/56, 53, 49

(56) References Cited

U.S. PATENT DOCUMENTS

| | | | | |
|---|---|---|---|---|
| 3,912,901 A | | 10/1975 | Strella et al. | 219/216 |
| 4,207,059 A | | 6/1980 | Gaitten et al. | 432/60 |
| 4,254,732 A | | 3/1981 | Moser | 118/60 |
| 4,810,564 A | * | 3/1989 | Takahashi et al. | 428/213 |
| 5,291,257 A | | 3/1994 | Cerrah et al. | 399/333 |
| 5,547,742 A | | 8/1996 | Satoh et al. | 428/215 |
| 5,547,759 A | | 8/1996 | Chen et al. | 428/421 |
| 5,582,917 A | * | 12/1996 | Chen et al. | 428/421 |
| 5,709,949 A | | 1/1998 | Chen et al. | 428/421 |
| 5,729,813 A | * | 3/1998 | Eddy et al. | 399/333 |
| 5,747,148 A | * | 5/1998 | Warner et al. | 428/212 |
| 6,203,917 B1 | * | 3/2001 | Davis et al. | 428/450 |

* cited by examiner

*Primary Examiner*—Blaine Copenheaver
*Assistant Examiner*—Christopher Paulraj
(74) *Attorney, Agent, or Firm*—Oliff & Berridge, PLC; Eugene Palazzo

(57) ABSTRACT

A wear resistant composite member such as a fuser roll or a pressure roll and a fuser system using the same. The fuser roll and/or the pressure roll comprises a core, a first layer, an optional second layer, and a surface layer wherein at least the first layer or optional second layer comprises a fluorocarbon polymer having ceramic-based particles substantially homogeneously distributed throughout the polymer and protruding from the surface of the polymer layer.

20 Claims, 2 Drawing Sheets

COMPOSITE MEMBER

FIELD OF THE INVENTION

The present invention relates to a long life composite member such as a long life composite fuser roll and a long life composite pressure roll that are especially useful in a fusing system in an electrophotographic reproducing apparatus including digital and color apparatuses and processes. In particular, the present invention relates to a fuser roll and a pressure roll having excellent wear resistance properties.

BACKGROUND OF THE INVENTION

In a typical electrophotographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

One of the more common approaches to thermal fusing of toner images is by the concurrent application of heat and pressure by various means such as a roll pair including a heated fuser roll and a pressure roll which are maintained in pressure contact through a fusing nip. The fusing of the toner particles takes place when the proper combination of heat, pressure and contact time are applied.

It is known to prepare a backup, fuser, or other type roll by utilizing one or more layers on a metal core. For example, U.S. Pat. No. 4,207,059 describes a backup roll constructed of a core member of heat conductive material and a heat insulative coating provided on the surface of the core member in at least the areas where it may make direct contact with the heated fuser roll. For instance, a backup roll is constructed of an aluminum core member coated with polyurethane reinforced fluorinated ethylene propylene.

U.S. Pat. No. 4,254,732 describes a backup or pressure roll having a solid metal core having adhered thereto a relatively thick layer of deformable material such as an elastomer of an ethylene-propylene terpolymer. U.S. Pat. No. 5,547,742 describes a fuser roll having a metal core shaft and a silicone rubber surface layer, such as polytetrafluoroethylene, tetrafluoroethylene/hexafluoropropylene copolymer, tetrafluoroethylene/ethylene copolymer, or tetrafluoroethylene/perfluoroalkyl vinyl ether copolymer. U.S. Pat. No. 3,912,901 describes a roll having a rigid core covered with a relatively thick elastomeric layer with a relatively thinner sleeve or layer of a high flex life material forming an outer surface for the roll. U.S. Pat. Nos. 5,709,949 and 5,547,759 describe a method of making a fuser member such as a fuser roller, pressure roller, or fuser belt, comprising bonding an outermost fluoropolymer resin layer to an inner fluoroelastomer layer by means of a fluoropolymer-containing polyamide-imide primer layer.

U.S. Pat. No. 5,291,257 describes a pressure roll that has a core and a surface coating that has been heat cured from a composition of a fluorocarbon polymer and an irregularly shaped, nonplanar, inert filler having a hardness greater than 8 Mohs. The filler has a nominal particle size of from about 10 to 30 microns and is present in the cured surface coating in an amount of from about 10% to 40% by weight of the total solids weight of the coating.

It is important that the pressure roll and fuser roll be durable and long-lasting. Otherwise, the rolls would require frequent replacement which is expensive and time consuming. Thus, the pressure roll and the fuser roll should each have a coating (top layer) that is very durable and long lasting. Typically, such properties are imparted by a top layer containing a powder mixture of silicon carbide (SiC) and perfluoroalkoxy (PFA) TEFLON. However, there have been difficulties associated with providing a suitable coating with this powder mixture.

First, because of the electrostatic differences between silicon SiC and PFA, it is difficult to provide a uniform distribution of SiC to the surface of the roll during electrostatic application. The PFA adheres uniformly to the roll but the SiC does not. As a result, insufficient SiC is applied to the roll and the SiC content on the roll is not uniform.

Second, because the SiC and PFA are applied as a powder, there is a lot of wasted powder which falls to the bottom of the application equipment as over spray. Further, because of the electrostatic differences between silicon SiC and PFA discussed above, SiC does not sufficiently adhere to the roll but instead drops to the bottom of the application equipment along with the wasted powder. It is difficult to predict and control how much of the SiC adheres to the roll and how much falls to the bottom. Since over sprayed powder collected at the bottom is a mixture of over sprayed PFA and SiC powder together with SiC powder that did not adhere to the roll, it is likewise difficult to determine the percentage of SiC in the bottom powder mixture.

Testing methods, such as thermogravimetric analysis, do not work well. During the thermal decomposition of TEFLON, HF is formed which subsequently reacts with Si to form volatile $SiF_4$. The volatile $SiF_4$ causes deviations in thermogravimetric analysis such that the results indicate less SiC% than there actually is. Hence, an accurate amount of SiC in the waste powder cannot be readily determined and the waste powder cannot be reused in the present prior art processes.

Thus, it is desirable to provide a composite roll that is durable and long lasting, but does not have the waste associated with the prior powder coating methods.

SUMMARY

Accordingly, the present invention is directed to providing a durable, long life, wear resistant composite member such as, but not limited to, a composite fuser roll or a composite pressure roll, prepared from a polymer liquid having a homogenous distribution of ceramic-based particles such as SiC particles.

Composite members containing ceramic-based particles in accordance with the present invention have a prolonged life of, for example, at least 10% over the life of a composite member without ceramic particles.

In one embodiment, the present invention is directed to a composite member comprising a substrate, a first layer, a second layer, and a surface layer, wherein the second layer comprises a polymer having ceramic-based particles substantially homogeneously distributed throughout the polymer and protruding from the surface of the polymer layer into the surface layer. In another embodiment, the present invention is directed to a composite member comprising a substrate, a first layer and a surface layer wherein the first layer comprises a polymer having ceramic-based particles substantially homogeneously distributed throughout the polymer and protruding from the surface of the polymer layer.

In a preferred embodiment, the member is a roll and the substrate is a core, preferably of steel or aluminum.

In a further embodiment, the polymer is a fluorocarbon polymer, more preferably, selected from the group consisting of polytetrafluoroethylene, perfluoroethylene perfluoroalkylvinylether and mixtures thereof.

In a further embodiment, the ceramic-based particles preferably comprise SiC, alumina, or mixtures thereof, most preferably SiC. Preferably, the average size of said ceramic-based particles ranges from about 5 to about 30 microns, more preferably, about 20 microns, and said ceramic-based particles are present in an amount from about 5% to about 40% by weight solids based on total weight of the second layer.

Another embodiment is a fuser system which comprises a fuser roll and a pressure roll provided to form a fusing nip therebetween for fusing a toner image to a substrate, wherein at least one of said fuser roll or said pressure roll comprises a core, a first layer, an optional second layer, and a surface layer wherein at least the first layer or optional second layer comprises a polymer having ceramic-based particles substantially homogeneously distributed throughout the polymer and protruding from the surface of the polymer layer.

In a further embodiment, the polymer is preferably selected from the group consisting of polytetrafluoroethylene, perfluoroethylene perfluoroalkylvinylether, and mixtures thereof. The ceramic-based particles preferably comprise SiC, alumina, or mixtures thereof, preferably SiC. The average size of the ceramic-based particles ranges from about 5 to about 30 microns, preferable about 20 microns, and the particles are present in an amount from about 5% to about 40% by weight solids based on a total weight of the first layer.

A further embodiment is a method of making a composite member comprising forming a polymer layer on a substrate by applying to said substrate a composition comprising a liquid fluorocarbon polymer having a substantially homogenous distribution of ceramic-based particles, drying to form a polymer layer having said particles protruding from the surface of said polymer layer, and then applying a surface layer to said polymer layer. In another embodiment, a first layer is applied to the substrate prior to forming a polymer layer.

Preferably, the average size of said ceramic-based particles ranges from about 5 to about 30 microns and the ceramic-based particles are present in an amount from about 5% to about 40% by weight solids based on total weight of the polymer layer.

In yet enother embodiment, the present invention is directed to an electrophotographic system comprising a fuser component and a pressure component provided to form a fusing nip therebetween for fusing a toner image to a substrate, wherein at least one of said fuser roll or said pressure component comprises a core, a first layer, an optional second layer, and a surface layer wherein at least the first layer or optional second layer comprises a fluorocarbon polymer having ceramic-based particles substantially homogeneously distributed throughout the polymer and protruding from the surface of the polymer layer.

DETAILED DESCRIPTION OF CERTAIN PREFERRED EMBODIMENTS

Although the present invention is directed to any type of composite member, such as a belt, the invention will be described in terms of a composite roll.

Figure 1:
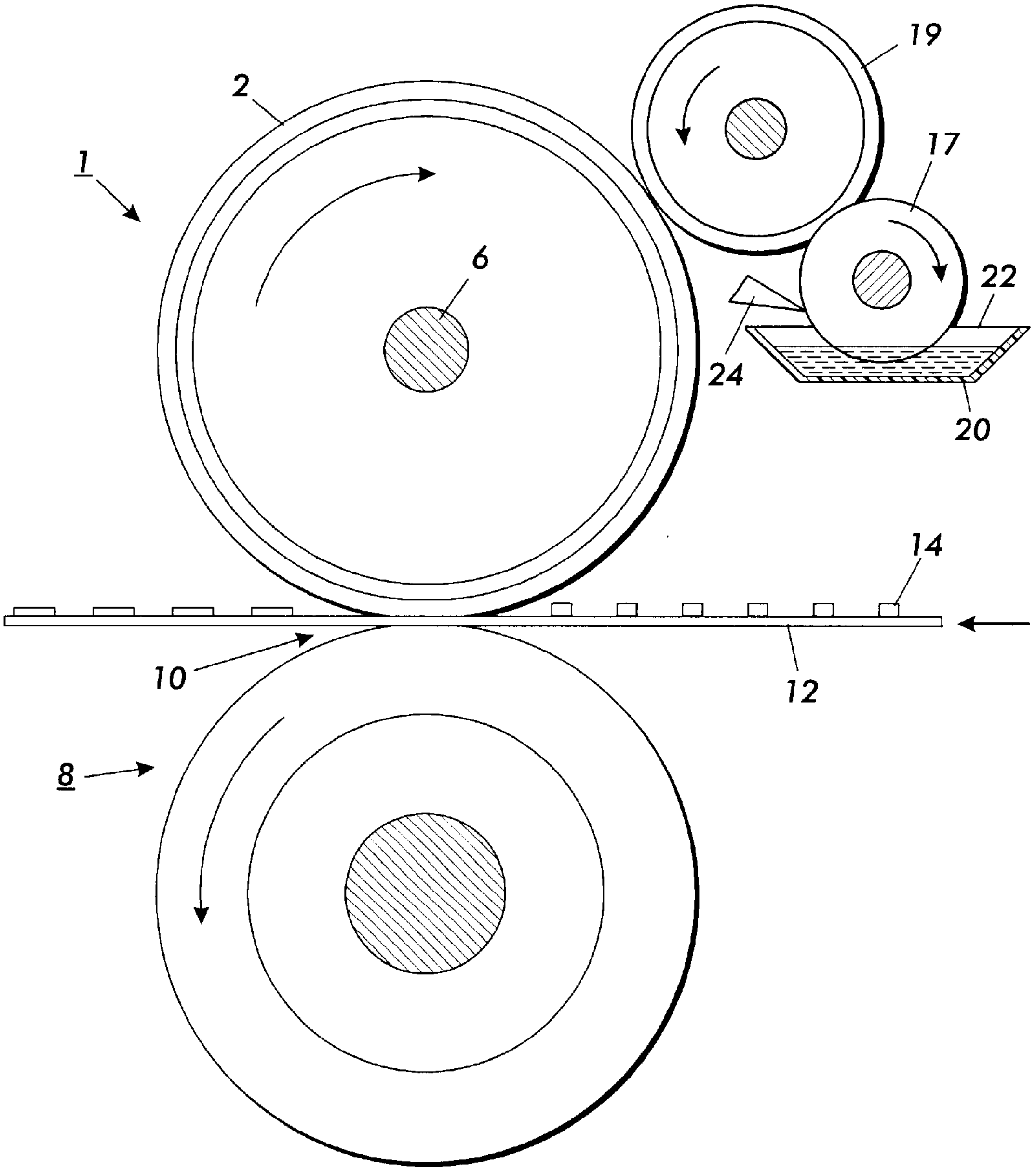
FIG. 1 is a sectional view of one embodiment of a fuser system which may use the pressure roll and/or fuser roll of the present invention.

The composite pressure roll and fuser roll of the present invention may be used in a fuser assembly. A typical fuser assembly is shown in FIG. 1 where the numeral 1 designates a fuser roll having a suitable heating element 6 disposed in the hollow portion thereof which is coextensive with the cylinder. Backup or pressure roll 8 cooperates with fuser roll 1 to form a fusing nip or contact arc 10 through which copy paper or other substrate 12 passes such that toner images 14 thereon contact elastomer surface 2 of fuser roll 1. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 rotatably mounted (rotatable in the direction indicated) are provided to transport release agent 22 from the sump 20 to the elastomer surface 2. As illustrated in FIG. 1, roll 17 is partly immersed in the sump 20 and transports via its surface, release agent from the sump to the delivery roll 19. By using a metering blade 24, a layer of polymeric release fluid can initially be applied to delivery roll 19 and thereby to elastomer surface 2 in a controlled thickness ranging from about a submicrometer to about several micrometers. Thus, by metering device 24, from about 0.1 to about 2 micrometers or greater fluid can be applied to the surface of elastomer surface 2.

The present invention is directed to the preparation and composition of pressure rolls, fuser rolls, and any other rolls that preferably have a long wear surface. The pressure roll and fuser roll may optionally be the same or different. For example, the fuser roll may have two layers whereas the pressure roll may have three layers. Alternatively, the compositions of the different layers in the fuser roll may be varied from the composition of the corresponding layers in the pressure roll.

For ease of discussion, the fuser roll and the pressure roll (or any other type of roll) will be referred to collectively as a composite roll. The composite roll has suitable base member which is a hollow cylindrical tube or core fabricated from any suitable metal such as aluminum, anodized aluminum, steel such as stainless steel, nickel, copper, and the like. The pressure roll preferably has a rigid steel core whereas the fuser roll preferably has an aluminum core. The substrate is preferably rigid, although in some instances, it may be somewhat flexible. While a hollow core is preferred, it may also be solid, honeycombed, or the like.

Figure 2:
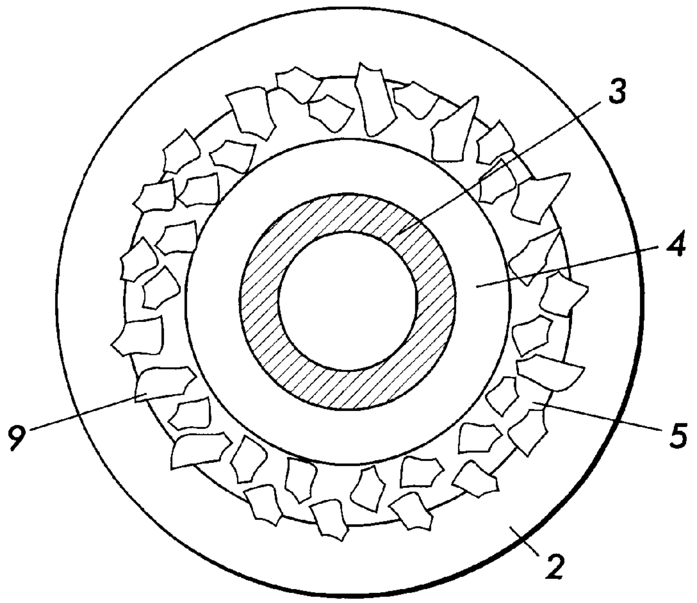
FIG. 2 is a sectional view of one embodiment of a three layer composite roll depicting particles in the second layer.
Figure 3:
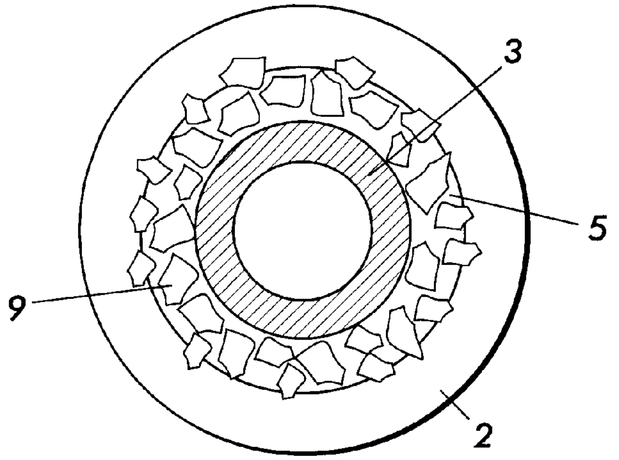
FIG. 3 is a sectional view of one embodiment of a two layer composite roll depicting particles in the first layer.

The composite roll has either two or three coating layers. FIG. 2 depicts a composite roll with three layers. The three layer roll comprises a substrate core 3, a first layer 4, an optional second layer 5 containing ceramic-based particles 9, and an elastomer surface layer 2. FIG. 3 depicts a composite roll with two layers. The two layer roll comprises a substrate core 3, a first layer 7 containing ceramic-based particles 9, and an elastomer surface layer 2. Preferably, the surface layers, in each case, are prepared from powdered TEFLON. The ceramic-based particles 9, in each case, are large enough to protrude into the surface layer 2. Generally, the three layer rolls are more expensive to produce and last longer than the two layer rolls.

The first layer, 4 or 7, may be prepared from any suitable liquid material and is generally a relatively thick resilient material such as an elastomer. Any suitable liquid fluorocarbon polymer may be used in forming the first layer. Generally, a TEFLON primer contains some amount of fluoropolymer and a high temperature resistant organic resin (mostly polyimid). Polyimid provides the adhesion to the metal substrate while fluoropolymer in the primer fuses with the fluoropolymer in the adjacent layer, either 5 or 2.

Regarding a two layer composite roll, ceramic-based particles are homogeneously distributed in the liquid polymer prior to application to the substrate core 3. In the case of a three layer composite roll, no particles are distributed in the first layer. Instead an second layer is applied over the first layer. The second layer is produced from a composition of any suitable liquid fluorocarbon polymer having a homogenous distribution of ceramic-based particles.

The first layer and optional second layer are preferably produced by the build up of a homogeneous film. Preferably, the layers are 0.1 to 1.5 mil thick, more preferably, 0.2 to 1 mil thick.

The surface layer 2 for either a three layer composite roll or a two layer composite roll comprises a powder-coated fluorocarbon polymer. The surface layer is generally about 0.5 to about 2 mil thick, preferably about 1 mil thick.

Any suitable ceramic-based particles may be selected that provide the necessary long term wear. Ceramic loaded coatings last longer than "unfilled" coatings thus allowing more copies per roll and greater cost efficiencies.

The particles should be relatively inert (nonreactive). For example, the particles should be relatively inert to the fluorocarbon polymer, any other additives, or the release agent. The particles preferably have an average size of from about 5 to about 30 microns, preferably about 15 to 25, more preferably about 20 microns, to provide the desired wear resistance. The particle size is selected so that the particles will protrude from the first or second layer into the surface layer 2. Ceramic particles generally do not have a spherical shape like, for example, glass beads. Thus, they normally have irregular shapes and are characterized by range or distribution of particle size. The particles are typically measured by a SEM (scanning electron microscope), optical methods using laser diffraction (Malvern Instrument Inc.) and information supplied by silicon carbide manufacturer (Fujimi Corporation).

By protruding into the surface layer 2, the wear resistance of the surface layer is improved. Generally, about 5 to 60% of the "height" of particle protrudes into the surface layer. Since the geometry of particles are irregular, some percentage of the total particle population is oriented in a fashion that they do not protrude at all. The average particle size should be selected so that it is sufficiently larger than the dry film thickness (DFT) of the layer in which the ceramic particles are dispersed.

As a non-limiting example, in a two-coat composite fuser coating in which the thickness of the primer layer is 0.3 mil (approx. 8 micron) DFT, whereby a powder Teflon PFA surface layer is applied with a thickness of 1 mil (25 micron), and having a 30% SiC (by weight of total solids of primer), the average SiC particle size is selected to be about 20 micron. About 8 micron segment of the average SiC particle will be embedded into the primer layer, while approximately 12 micron segment of the particle will protrude into the powdercoated PFA Teflon layer. Since topcoat layer (powdercoated PFA Teflon) is about 1 mil (=25 micron) thick, 12 micron upper portion of the average SiC particle will not protrude outside of the top coat layer, rather will be embedded into the topcoat.

In addition to the size, the particles should be present in a weight ratio of the first or optional second layer from about 5 to about 40% by solids weight and preferably from about 25 to about 30% by solids weight to provide the preferred physical integrity of the coating film. The percentages by weight are based on a total weight of the coating without the volatiles. Optimum results in obtaining physical integrity are achieved at about 28% by weight of particles by weight based on the total weight of the first layer or the optional second layer on the composite roll.

While any suitable ceramic-based particles may be used in the practice of the present invention, SiC, alumina (fused and calcined), or mixtures thereof are preferred. Both SiC and alumina have similar hardness and good wear properties. SiC is particularly preferred due to its high heat transfer coefficient. Because heat transfer is required during the fusing, the higher the heat transfer coefficient the better.

Typical SiC particles suitable for use in the practice of the present invention are available from Fujimi under the designation GC-600. Preferred alumina particles are the fused alumina particles available from Buehler Ltd., Malvern, Pa. under the formulation 40-6620-200-080. This fused alumina is about 97% pure with about 2% by weight titanium dioxide and small amounts of silicon dioxide, ferric oxide and sodium oxide and has an average particle size diameter of 20 microns. Other alternative fused particles suitable for use with the present invention are those available from Fujimi Corporation, Elmhurst, Ill. under the designation PWA-30, A-600.

Typical liquid fluorocarbon polymers that may be selected include, but are not limited to, polytetrafluoroethylene (PTFE) perfluoroethylene perfluoroalkylvinylether (PFA) and mixtures thereof. Typical commercially available materials include, but are not limited to, the liquid polymers available from E. I. DuPont under the product designations: 851-224 (PTFE), 857-200 (PFA) and 855-401 (PTFE and PFA). These TEFLON products are proprietary formulations of DuPoint. Each liquid TEFLON product (primer, midcoat or topcoat) is designed to be used "as supplied" with the right viscosity; generally ranging from 300 centipoise (CPS) to 1000 cps.

A material that has been found to be particularly effective in the practice of the present invention is a blend of polytetrafluoroethylene (PTFE) and perfluoroalkyl perfluorovinyl ether (PFA) available from E. I. DuPont deNemours, Co., Inc., Wilmington, Del. under the product designation 855-401. This material is believed to contain polytetrafluoroethylene, perfluoroethylene perfluoroalkylvinylether polymer, acrylic polymer, oleic acid, octylphenoxypolyethoxyethanol surfactant, diethylene glycol monobutyl ether, water, triethanolamine and an aromatic hydrocarbon. It contains about 43.54% by weight solids and 56.46% by weight volatile material which corresponds to about 73.80% by volume. The polymer blend is believed to be primarily polytetrafluoroethylene (PTFE) with about 10% by weight perfluoroalkyl perfluorovinyl ether (PFA).

The composite roll, according to the present invention, may be fabricated with conventional manufacturing processes and conventional spray processes with liquid polymers. Typically, the metal substrate is degreased in a conventional manner with conventional solvents such as aqueous cleaners or trichloroethylene. This is followed by grit blasting to roughen the surface with 46 grit alumina to provide a 120–180 microinch Ra roughened surface on steel.

With an aluminum substrate, 80 grit alumina is used to provide the 120 to 180 microinch Ra roughened surface.

If no second layer is present, then the first layer contains the ceramic-based particles. A primer suitable for use in the first layer of the present invention includes a primer such as DuPont's 850-314 which contains polytetrafluoroethylene polymer, chromium oxide, sodium lauryl sulfate, toluene and water and the additive VM-7799, which is an acid mixture of phosphoric acid and chromic acid. Preferably, the ceramic-based particles are added to the primer with stirring and roller mixing to ensure uniform suspension of the particles in the polymer. Thereafter, the suspension is filtered through a 50 mesh (or finer) filter and finally sprayed (in one or more passes) onto the substrate into a film having a dry film thickness from about 0.2 to about 1 mil. This is followed by drying in ambient air for a time from about 20 to about 30 minutes. The dried layer contains ceramic-based particles which protrude from the surface of the layer.

If a second layer is present, then the first layer preferably does not contain the ceramic-based particles. Instead the primer, such as DuPont's 850-021, is directly applied to the grit blasted substrate and permitted to air dry.

Preferably, the second layer of the composite roll can also be prepared in a conventional manner by pouring the polymer into a vessel, adding the ceramic-based particles with stirring and roller mixing to ensure uniform suspension of the particles in the polymer. Thereafter the suspension is filtered through a 50 mesh (or finer) filter and finally sprayed (in one or more passes) onto the primed substrate into a film having a dry film thickness from about 0.2 to 2 mil. This is followed by drying in ambient air for a time from about 20 to about 30 minutes. The dried layer contains ceramic-based particles which protrude from the surface of the layer.

Thereafter, a powdered fluoropolymer (TEFLON) such as powder PFA is coated on top of the first layer or second layer.

The composite roll is then placed in an oven for a time from about 25 to about 50 minutes at a temperature from about 800 to about 820° F. The composite roll is then polished on a lathe rotating at a speed of about 1000 rpm with sand paper having a roughness of about 600 grit to provide a finished roughness of about 10 to about 15 microinches Ra.

In either the two layer or three layer embodiment, a wear resistant composite coating is formed whereby the the distribution of SiC is uniform around the fuser roll. In addition, the formulation can be customized based on the application/need. The use of only powder Teflon PFA as the surface layer eliminates the uncertainties about the percentage and the distribution of the ceramic filler both in the topcoat mixture and the overspray. During use, the surface layer is worn away only down to the extent of the protruded particles. The protruded particles then prevent or substantially reduce further wear of the surface layer. Thus, the useful life of the composite roll according to the present invention is prolonged by, for example, at least 10% over the useful life of conventional fuser and pressure rolls.

EXAMPLES

The following Examples further describe fuser members prepared by the present invention. The Examples are illustrative and are not intended to limit the scope of the claimed invention. Unless otherwise indicated, all parts and percentages are by weight.

Example 1

A composite roll was prepared according to the above described general procedure as follows: A steel tube Grade 118, 40 millimeters in diameter was degreased with 1,1,1 trichloroethylene followed by grit blasting with 46 grit Norton Dynablast aluminum oxide to a surface roughness of Ra=120+/−20 microinch under air pressure of 80 psi while being rotated in a fixture at 44 rpm for one 45 second pass. "Federal Surfanalyzer System 2000" was used to measure the surface roughness. The core was removed from the fixture and sprayed with dry filtered air to clean the surface.

The cleaned grit blasted steel core was placed in a rotator device in a spray booth and rotated and a liquid primer DuPont 855-021 was sprayed on the core with a De Vilbiss:JGA-502 spray gun to provide a dry primer film of 0.2 to 0.35 mil. thickness with one pass.

A second layer was prepared by adding 20 micron particle size SiC (FuJimi brand) to a liquid blend of polytetrafluoroethylene and perfluoroethylene perfluoroalkylvinylether polymer (DuPont PTFE/PFA Liquid Coating 855-401) in an amount to provide 25% SiC by weight solids. The SiC powder was dispersed into the coating by stirring with a spatula for about one minute followed by roller mixing to ensure uniform suspension of the SiC in the coating. The primed core was then placed in a rotator device in a spray booth and rotated. The second layer was sprayed onto the primed steel core with a De Vilbiss JGA-502 spray gun to provide a dry film thickness of 0.5 to 1 mil.

A powder surface layer of PFA (DuPont 532-5011) was applied to the second layer with a film thickness of approximately 1 mil. The coated roll was dried in ambient air for about 20 minutes after which it was cured by being placed in an oven preheated to 800° F. for a residence time of 45 minutes. The roll was then removed from the oven and permitted to cool to ambient conditions (70° F. at 40% relative humidity). The cooled roll was then placed in a lathe and polished at about 1000 rpm in two passes with 600 grit sandpaper to a surface roughness of about 10–15 microinches. The unpolished roll had a surface roughness of about 50–70 microinches.

Example 2

A composite roll was prepared according to the above described general procedure as follows: An aluminum 6063 T4 tube with a 2 inch outside diameter and 13 inch length was gritblasted with 80 grit alumina and cleaned with aqueous cleaner.

A SiC filled liquid primer (DuPont primer 855-021+20% SiC, 20 micron size) was applied to the tube to a dry film thickness of about 0.5–1 mil. After 15–20 minutes air-flash, the liquid film layer was powdercoated with DuPont (532-5011) powder PFA. The composite roll was then cured at 800° F. for about 45 minutes.

The roll was then cooled to ambient conditions The cooled roll was placed in a lathe and polished at about 1000 rpm with 600 grit sandpaper to a surface roughness of about 10–15 microinches.

All the patents and applications referred to herein are incorporated herein by reference in their entirety.

While the invention has been described in detail with reference to specific and preferred embodiments, it will be appreciated that modifications and variations will be apparent to the skilled artisan. While the present invention has been described as a composite roll useful as a pressure roll or a fuser roll, it will be understood in certain applications it may have utility as a donor roll or other types of rolls. All such modifications and embodiments as may readily occur to one skilled in the art are intended to be within the scope of the appended claims.

What is claimed is:

1. A composite roll, comprising:

a core;

a first layer on the core;

a second layer on the first layer, the second layer having a dry film thickness; and an elastomer surface layer on the second layer, wherein the second layer comprises a polymer and ceramic-based particles having an average particle size greater than the dry film thickness of the second layer, the ceramic-based particles being substantially homogeneously distributed throughout the polymer and protruding from the surface of the second layer into the surface layer.

2. The composite roll of claim 1 wherein said ceramic-based particles comprise SiC, alumina, or mixtures thereof.

3. The composite roll of claim 2 wherein said ceramic-based particles comprise SiC.

4. The composite roll of claim 1 wherein the average size of said ceramic-based particles ranges from about 5 to about 30 microns and said ceramic-based particles are present in an amount from about 5% to about 40% by weight solids based on total weight of the second layer.

5. The composite roll of claim 4 wherein the average size of said ceramic-based particles is about 20 microns.

6. The composite roll of claim 1, wherein said core is steel or aluminum.

7. The composite roll of claim 1, wherein the polymer of the second layer is a fluorocarbon polymer.

8. The composite roll of claim 7, wherein said fluorocarbon polymer is selected from the group consisting of polytetrafluoroethylene, perfluoroethylene perfluoroalkylvinylether and mixtures thereof.

9. The composite roll of claim 1, wherein the ceramic-based particles have a height, and from about 5 to 60% of the height of the ceramic-based particles protrudes into the surface layer.

10. A composite roll, comprising:

a substrate core;

a first layer on the core, the first layer having a dry film thickness; and an elastomer surface layer on the first layer, wherein the first layer comprises a polymer and ceramic-based particles having an average particle size greater than the dry film thickness of the first layer, the ceramic-based particles being substantially homogeneously distributed throughout the polymer and protruding from the surface of the first layer into the surface layer.

11. The composite roll of claim 10 wherein said ceramic-based particles comprise SiC, alumina, or mixtures thereof.

12. The composite roll of claim 11 wherein said ceramic-based particles comprise SiC.

13. The composite roll of claim 10 wherein the average size of said ceramic-based particles ranges from about 5 to about 30 microns and said ceramic-based particles are present in an amount from about 5% to about 40% by weight solids based on a total weight of the first layer.

14. The composite roll of claim 13 wherein the average size of said ceramic-based particles is about 20 microns.

15. The composite roll of claim 10, wherein said core is steel or aluminum.

16. The composite roll of claim 10, wherein the polymer of the first layer is a fluorocarbon polymer.

17. The composite roll of claim 16, wherein said fluorocarbon polymer is selected from the group consisting of polytetrafluoroethylene, perfluoroethylene perfluoroalkylvinylether, and mixtures thereof.

18. The composite roll of claim 10, wherein the ceramic-based particles have a height, and from about 5 to 60% of the height of the ceramic-based particles protrudes into the surface layer.

19. A composite roll, comprising:

a core;

a first layer on the core;

a second layer on the first layer, the second layer having a dry film thickness; and an elastomer surface layer on the second layer, wherein the second layer comprises a fluorocarbon polymer and SiC particles having an average particle size greater than the dry film thickness of the second layer, the SiC particles being substantially homogeneously distributed throughout the fluorocarbon polymer and protruding from the surface of the second layer into the surface layer.

20. The composite roll of claim 19, wherein the ceramic-based particles have a height, and from about 5 to 60% of the height of the ceramic-based particles protrudes into the surface layer.

* * * * *